(12) United States Patent
Diez et al.

(10) Patent No.: US 7,407,164 B2
(45) Date of Patent: Aug. 5, 2008

(54) GASKET

(75) Inventors: Armin Diez, Lenningen (DE); Bernd Weis, Dettingen (DE); Thomas Anhorn, Dettingen (DE)

(73) Assignee: ElringKlinger AG, Dettingen (DE)

( * ) Notice: Subject to any disclaimer, the term of this patent is extended or adjusted under 35 U.S.C. 154(b) by 298 days.

(21) Appl. No.: 11/018,419

(22) Filed: Dec. 21, 2004

(65) Prior Publication Data
US 2006/0131818 A1 Jun. 22, 2006

(51) Int. Cl.
*F02F 11/00* (2006.01)
(52) U.S. Cl. .................................. 277/592; 277/596
(58) Field of Classification Search .......... 277/591–596
See application file for complete search history.

(56) References Cited

U.S. PATENT DOCUMENTS

| | | | | |
|---|---|---|---|---|
| 4,300,779 A | * | 11/1981 | DeCore et al. | 277/601 |
| 5,542,683 A | * | 8/1996 | Papendorf et al. | 277/594 |
| 5,713,580 A | * | 2/1998 | Ueta | 277/593 |
| 5,938,208 A | | 8/1999 | Yoshida et al. | |
| 6,746,021 B2 | * | 6/2004 | Breen | 277/594 |
| 2001/0024017 A1 | | 9/2001 | Fujino et al. | |

FOREIGN PATENT DOCUMENTS

| | | |
|---|---|---|
| DE | 30 01 730 A1 | 7/1980 |
| DE | 102 48 395 A1 | 5/2004 |
| DE | 102 48 396 A1 | 5/2004 |
| DE | 103 01 713 A1 | 7/2004 |
| EP | 1 136 731 A2 | 9/2001 |
| GB | 2 043 804 A | 10/1980 |
| WO | WO 2004/063604 A1 | 7/2004 |

* cited by examiner

*Primary Examiner*—William L. Miller

(57) ABSTRACT

In order to produce a gasket that is adapted to be arranged between two components requiring sealing of which at least one contains a first metallic material which is less noble than aluminium and the gasket comprises at least one gasket layer including a plate consisting of a second metallic material which is nobler than the first metallic material, such that contact corrosion on the components requiring sealing is reduced or completely prevented, it is proposed that the gasket layer should comprise a sealing element which is arranged at an outer boundary region of the plate, should consist of an elastomer material and, in the installed state of the gasket, should gasket the gap between the gasket layer and the component which contains the first metallic material in a substantially fluid-tight manner.

63 Claims, 4 Drawing Sheets

GASKET

FIELD OF THE INVENTION

The present invention relates to a gasket that is adapted to be arranged between two components requiring sealing of which at least one contains a first metallic material which is less noble than aluminium, said gasket comprising at least one gasket layer incorporating a plate consisting of a second metallic material which is nobler than the first metallic material.

BACKGROUND OF THE INVENTION

Such a gasket is known from DE 100 65 202 A1.

Such a gasket may, in particular, be a cylinder head gasket that is adapted to be arranged between the cylinder head and the engine block of an internal combustion engine wherein, for example, the engine block contains a magnesium alloy and the cylinder head gasket includes at least one beaded functional layer which comprises a sheet metal layer made of spring steel for ensuring adequate spring elasticity of the sealing beading lines.

In this description and the accompanying Claims, a metallic material is nobler than another metallic material if its electro-chemical potential is higher than the electro-chemical potential of the other metallic material.

As an example, some values from the electro-chemical electromotive series are indicated in the following table, wherein the potential of the hydrogen normal electrode serves as a base factor (null point):

| | |
|---|---|
| $Mg/Mg^{2+}$ | $-2.37$ V |
| $Al/Al^{3+}$ | $-1.66$ V without oxide film |
| | $-0.50$ V with oxide film |
| $Zn/Zn^{2+}$ | $-0.76$ V |
| $Cr/Cr^{2+}$ | $-0.56$ V |
| $Fe/Fe^{2+}$ | $-0.44$ V |
| $Ni/Ni^{2+}$ | $-0.24$ V. |

Thus, iron having an electrochemical potential of $-0.44$ V is nobler than aluminium which has an electro-chemical potential of $-1.66$ V, and, in turn, aluminium is nobler than magnesium which has an electro-chemical potential of $-2.37$ V.

Due to its position in the electromotive series, it is to be expected that magnesium and its alloys will have a significantly greater tendency to corrode upon contact with spring steel compared with aluminium and its alloys, particularly as aluminium is frequently protected by a skin of aluminium oxide.

If, on the one hand, metallic materials having different electro-chemical potentials are in electrically conductive contact with one another and, on the other hand, both materials are in contact with an electrolyte (for example, a film of moisture consisting of water) then contact corrosion will occur.

DE 30 01 730 A1 discloses a cylinder head gasket consisting of three metallic sheets which are held closely together, wherein the fluid-tightness in the vicinity of water and oil passage openings is produced with the aid of cords or tapes of elastomer material that are firmly connected to the middle metal sheet and gasket the gap between the middle metal sheet and the engine block and also the gap between the middle metal sheet and the cylinder head when the gasket is installed.

EP 1 136 731 A2 discloses a single layer gasket for sealing the housing for an engine chain, wherein a flexible sealing element is arranged at the edge of an opening in the gasket for the passage of the chain.

U.S. Pat. No. 5,938,208 A discloses a cylinder head gasket consisting of beaded metal plates, wherein the beads are provided with a coating of a synthetic material.

BRIEF SUMMARY OF THE INVENTION

The object of the present invention is to provide a gasket of the type specified hereinabove which reduces or completely prevents the occurrence of contact corrosion in the components requiring sealing.

In accordance with the invention, this object is achieved in the case of a gasket including the features specified herein in that the gasket layer including the plate consisting of the second metallic material which is nobler than the first metallic material comprises a sealing element which is arranged at an outer boundary region of the plate, consists of an elastomer material and, in the installed state of the gasket, gaskets the gap between the gasket layer and the component which contains the first metallic material that is less noble than aluminium in a substantially fluid-tight manner.

The concept underlying the solution in accordance with the invention is that of preventing any penetration of media that can lead to corrosion of the reactive metallic material into the region between the gasket layer and the component containing the reactive metallic material by means of a fluid-tight sealing arrangement for the gap between the gasket layer and the component containing the reactive metallic material. If such media, splashes of water for example, cannot enter the intermediary space between the gasket layer and the component containing the reactive metallic material from the exterior, then there will be no electrolyte available for forming a corrosive element and corrosion of the component containing the reactive metallic material, especially magnesium, can be prevented.

In particular, the first metallic material may be magnesium and the second metallic material, which is nobler than the first metallic material, may, in particular, be a spring steel.

An elastomer material that is relatively easily deformable is preferably used for the sealing element in order to enable the gap to be sealed in a particularly reliable manner by the sealing element.

In order to prevent this easily deformable sealing element being excessively deformed when clamping the gasket between the components requiring sealing, the sealing element is preferably arranged to be shunted by the force.

This can, for example, be effected in that the plate of the gasket layer, upon which the sealing element is arranged, is provided with at least one bead which comprises a coating containing an elastomer material, wherein the material of the coating on the bead is more difficult to deform by the effect of a compressive force than the material of the sealing element. The effect is thereby achieved that the bead is in series with the force and the sealing element is shunted by the force.

As an alternative or supplement thereto, provision may be made for the plate of the gasket layer to be provided with at least one bead which comprises a coating containing an elastomer material, wherein the material of the coating has a higher Shore hardness than the material of the sealing element.

The provision of a bead having a coating whose material has a higher Shore hardness and/or is more difficult to deform than the material of the sealing element is particularly suitable for use in seals which comprise just a single gasket layer.

In order to prevent a drop of a corrosion-enhancing medium, such, for example, as a splash of water which is in contact with the gasket layer and also with the component containing the reactive metallic material from forming on the outer surface of the sealing element, the sealing element preferably extends at least up to an outer edge of the gasket layer on which the sealing element is arranged.

For the same reason, it is of advantage if the sealing element extends at least up to an outer edge of a sealing surface of the component requiring sealing with which the sealing element is in contact in the installed state of the gasket.

In order to prevent the formation of drops in a particularly effective manner, it is expedient if the sealing element projects laterally beyond an outer edge of a sealing surface of the component requiring sealing with which the sealing element is in contact in the installed state of the gasket.

It is particularly expedient, if the sealing element projects laterally beyond the outer edge of the sealing surface by at least approximately 1 mm, preferably by at least approximately 2 mm.

On the other hand, it is of advantage if the sealing element projects laterally beyond the outer edge of the sealing surface by at most approximately 10 mm, preferably by at most approximately 6 mm.

Furthermore, it is particularly advantageous if the sealing element extends round an outer edge of the metallic plate of the gasket layer because this is a particularly effective way of preventing drops of a corrosion-enhancing medium from forming on the outer edge of the gasket, such drops being in contact with the metallic plate of the gasket layer on which the sealing element is arranged and also with the component containing the reactive metal.

For the same reason, it is of advantage if the plate of the gasket layer projects laterally beyond an outer edge of a sealing surface of the component requiring sealing with which the sealing element is in contact in the installed state of the gasket.

In a preferred embodiment of the invention, provision is made for the sealing element to be in the form of a linear element which extends along an outer edge of the gasket layer.

A particularly effective sealing arrangement for preventing splashes of water penetrating into the gap between the gasket and the adjacent component is obtained if the sealing element extends round the entire outer edge of the gasket layer.

In order to ensure that the sealing element is sufficiently deformable for producing an effective gasket of the gap between the gasket layer and the component containing the reactive metal, the thickness of the sealing element prior to the installation of the gasket is advantageously at least approximately 100 µm, preferably at least approximately 250 µm.

On the other hand it is expedient, if the thickness of the sealing element prior to the installation of the gasket is at most approximately 600 µm, preferably at most approximately 450 µm.

For the purposes of obtaining a good micro-gasket at the contact area between the sealing element and the component containing the reactive metal, it is expedient if the sealing element has a comparatively low Shore hardness of at most approximately 100, preferably of at most approximately 70.

Furthermore, for the purposes of preventing contact corrosion, it is expedient if a possible flow of current between the component containing the reactive metal and the gasket layer is suppressed by the sealing element.

Consequently, the sealing element preferably has an electrically insulating effect.

The sealing element may contain yet further constituents in addition to the elastomer material.

However, the gasket in accordance with the invention can be produced in a particularly simple manner if the sealing element is formed entirely of the elastomer material.

In particular, provision may be made for the sealing element to contain an addition-cross-linked silicone rubber and/or a condensation-cross-linked silicone rubber.

If the gasket comprises at least a first gasket layer and a second gasket layer which each comprise a metallic plate, then the sealing element can be arranged to be shunted by the force in a particularly simple and effective manner if provision is made for the plate of the first gasket layer to comprise an outer boundary region which projects laterally beyond an outer edge of the plate of the second gasket layer, and if the sealing element is arranged on that side of the outer boundary region of the first gasket layer which faces the second gasket layer.

If the gasket in accordance with the invention additionally comprises a third gasket layer which comprises a metallic plate, then provision may be made for the outer boundary region of the plate of the first gasket layer to project laterally beyond an outer edge of the plate of the third gasket layer and for a second sealing element to be arranged on that side of the outer boundary region which faces the third layer, said second sealing element comprising an elastomer material and, in the installed state of the gasket, sealing the gap between the first gasket layer and one of the components requiring sealing in a substantially fluid-tight manner.

Certain embodiments of the invention are directed to a group of components which comprises a first component and a second component, wherein at least one of the components contains a metallic material which is less noble than aluminium, and also comprises a gasket in accordance with the invention arranged between the first component and the second component.

Certain other embodiments are directed to the use of a gasket in accordance with the invention that is adapted to be arranged between two components requiring sealing, wherein at least one of the components contains a metallic material which is less noble than aluminium.

The further object of the present invention is to provide a gasket which is adapted to be arranged between two components requiring sealing and comprises at least a first gasket layer and a second gasket layer that respectively comprise a metallic plate, such that the gasket will reduce or completely prevent contact corrosion on the components requiring sealing.

In accordance with the invention, this object is achieved in the case of a gasket incorporating the features by virtue that the plate of the first gasket layer comprises an outer boundary region which projects laterally beyond an outer edge of the plate of the second gasket layer and in that a sealing element is arranged on that side of the outer boundary region which faces the second layer, said sealing element comprising an elastomer material and, in the installed state of the gasket, sealing the gap between the first gasket layer and one of the components requiring sealing in a substantially fluid-tight manner.

The concept underlying the solution in accordance with the invention is that of preventing any penetration of media that could lead to corrosion of the metallic material of the component into the region between the gasket layer and the component by means of a fluid-tight sealing arrangement for the gap between the gasket layer and the component on which the sealing element is disposed. If such media, splashes of water for example, cannot enter the intermediary space between the gasket layer and the component from the exterior, then there will be no electrolyte available for forming a corrosive element and corrosion of the metallic material contained in the component can be prevented.

Prevention of this contact corrosion is of particular advantage, if the component on which the sealing element is seated in the installed state of the gasket contains a metallic material which is less noble than aluminium, i.e. magnesium for example.

In order to achieve particularly reliable sealing of the gap by the sealing element, an elastomer material which is relatively easily deformable is preferably made use of for the sealing element.

Because the sealing element is arranged at the outer boundary region of the first gasket layer which projects laterally beyond the outer edge of the plate of the second gasket layer, the effect is achieved that the sealing element is arranged to be shunted by the force so that excessive deformation of the easily deformable sealing element is prevented when clamping the gasket between the components requiring sealing.

If the gasket in accordance with the invention additionally comprises a third gasket layer which comprises a metallic plate, then provision may be made for the outer boundary region of the first gasket layer to project laterally beyond an outer edge of the plate of the third gasket layer and for a second sealing element to be arranged on that side of the outer boundary region which faces the third layer, said sealing element comprising an elastomer material and, in the installed state of the gasket, sealing the gap between the first gasket layer and one of the components requiring sealing in a substantially fluid-tight manner.

The corrosion-decreasing effect of the gasket in accordance with the invention is particularly useful if the component, upon which the sealing element is seated in the installed state of the gasket, contains a metallic material which is less noble than aluminium.

In particular, such a metallic material can be magnesium or a magnesium alloy.

Furthermore, in a preferred embodiment of the gasket in accordance with the invention, provision is made for the plate of the first gasket layer to be formed from a metallic material which is nobler than the metallic material from which the boundary region of the component is formed and upon which the sealing element is seated in the installed state of the gasket.

Still other embodiments of the invention are directed toward a group of components which comprises a first component and a second component wherein at least one of the components contains a metallic material which is less noble than aluminium, and also comprises a gasket in accordance with the invention which is arranged between the first component and the second component.

Further embodiments are directed to the use of a gasket in accordance with the invention which is adapted to be arranged between two components requiring sealing, wherein at least one of the components contains a metallic material which is less noble than aluminium.

Further features and advantages of the invention form the subject matter of the following description and the graphic illustration of exemplary embodiments.

BRIEF DESCRIPTION OF THE DRAWINGS

In the drawings.

Similar or functionally equivalent elements are designated in each of the Figures by the same reference symbols.

DETAILED DESCRIPTION OF THE INVENTION

Figure 1:
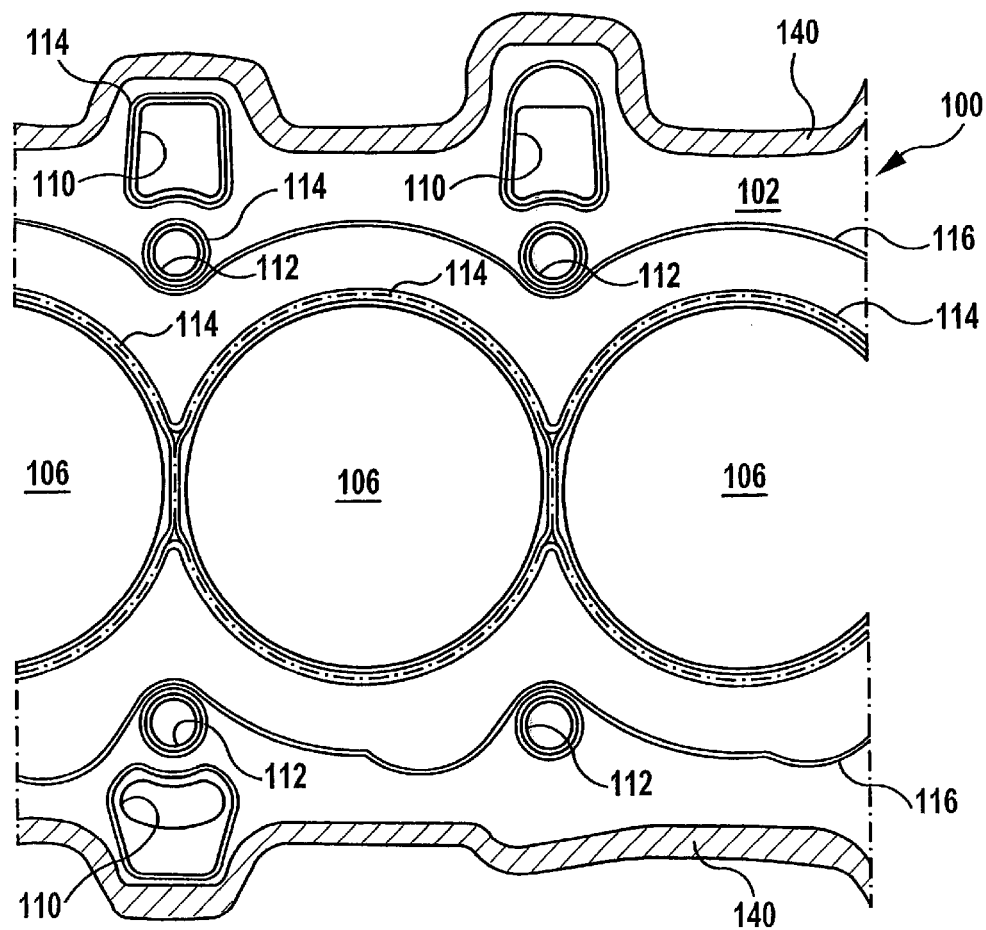
FIG. 1 shows a partial plan view of a cylinder head gasket from below.
Figure 2:
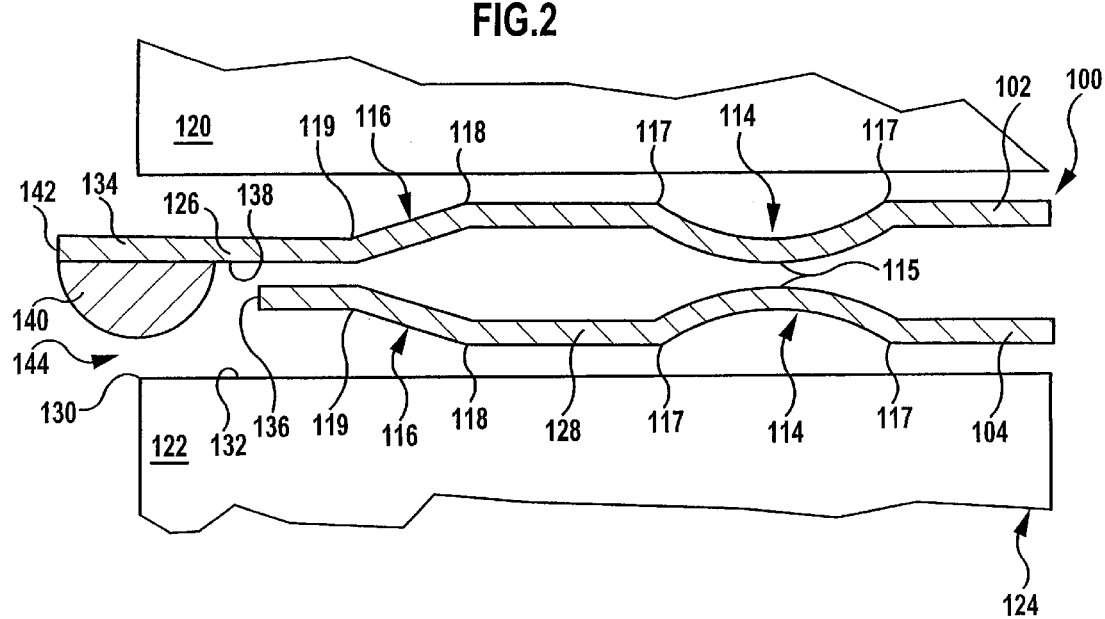
FIG. 2 a schematic section through the gasket depicted in FIG. 1 and through two components bordering the gasket (an engine block and a cylinder head) in a boundary region of the cylinder head gasket.

A cylinder head gasket which bears the general reference 100 and is illustrated in FIGS. 1 and 2 has a double layer structure having an upper functional layer 102 and a lower functional layer 104 for example.

The cylinder head gasket 100 comprises several passages, for example, combustion chamber passages 106 and fluid passages 110 as well as passages 112 for mounting means.

For the purposes of sealing these passages, the functional layers 102, 104 of the cylinder head gasket 100 are provided with beads 114 which surround the respective passage.

Furthermore, the functional layers 102, 104 are provided with additional beads 116 which extend between the passages 112 for the mounting means on the one hand and the beads 114 surrounding the combustion chamber passages 106 on the other and enclose all of the combustion chamber passages 106 in the cylinder head gasket 100.

The beads 114 and 116 may be in the form of full-beads (having a cross-section which corresponds to a flattened U) or in the form of half-beads (having a cross-section which corresponds to a flattened Z).

In the case of the beads 114 illustrated in FIG. 2, these are full-beads comprising a central bead-crest 115 and bead-feet 117 forming the lateral delimitations of the beads.

In the case of the beads 116 illustrated in FIG. 2, these are half-beads having an inner bead-edge 118 and an outer bead-edge 119.

The cylinder head gasket 100 is arranged between a first component 120, for example, a cylinder head which is formed from an aluminium alloy for example, and a second component 122, for example, an engine block which is formed at least in sections from a magnesium alloy, and said gasket together with the components 120 and 122 form a group of components 124.

In order to allow the beads 114 and 116 to be stamped into the respective functional layers 102 and 104 in a simple manner and for them to exhibit adequate resilient spring properties when the engine is operative, the functional layers 102 and 104 each comprise a respective metallic plate 126 and 128 made of spring steel.

As can be seen from FIG. 2, the metallic plate 128 of the lower functional layer 104, which is seated on the second component 122 in the installed state of the cylinder head gasket 100, does not extend up to the outer edge 130 of the sealing surface 132 of the second component 122 facing the cylinder head gasket 100, but rather, it ends at a distance of several millimeters before this outer edge 130.

By contrast, the metallic plate 126 of the upper functional layer 102 comprises an outer boundary region 134 which projects laterally beyond the outer edge 136 of the metallic plate 128 of the lower functional layer 104 and also beyond the outer edge 130 of the sealing surface 132 of the second component 122.

A sealing element 140 consisting of an elastomer material is arranged on the lower surface 138 of the boundary region 134 facing the second component 122, said sealing element being in the form of a sealing bead extending along the outer edge 142 of the metallic plate 126 and having a substantially semicircular cross-section (in the non-compressed state of the cylinder head gasket 100) and it also extends outwardly up to the outer edge 142 of the metallic plate 126.

The sealing element 140 extends along the outer edge 142 over the entire periphery of the upper functional layer 102.

The sealing element 140 has a height of approximately 250 µm to approximately 450 µm (as measured perpendicularly to the major faces of the metallic plate 126). In FIG. 2, the height of the sealing element 140 has been greatly emphasised compared with the metallic plates 126 and 128 which have thicknesses within a range of approximately 0.2 mm to approximately 0.3 mm.

The depth of the sealing element 140 is at its greatest at the position where it rests on the outer edge 130 of the second component 122 in the installed state of the cylinder head gasket 100.

Due to the easily deformable resilient nature of the sealing element 140, the sealing element 140, which is pressed against the sealing surface 132 of the second component 122 in the installed state of the cylinder head gasket 100, seals the gap 144 between the upper functional layer 102 and the second component 122 in fluid-tight manner so that water splashes cannot penetrate into this gap 144 from the exterior.

Furthermore, the sealing element 140, which is formed from an electrically non-conductive elastomer material, functions as an electrical insulator between the second component 122 and the metallic plate 126 of the upper functional layer 102 so that any possible flow of current between the magnesium-containing second component 122 and the metallic plate 126 of the upper functional layer 102 is prevented. The sealing element 140 thus serves as a so-called "ionic insulator".

Crevice corrosion of the magnesium alloy of the second component 122 is prevented by virtue of the sealing effect in regard to the penetration of water splashes from the exterior and the electrical insulating effect of the sealing element 140.

Furthermore, due to the fact that the element 140 projects beyond the outer edge 130 of the sealing surface 132 of the second component 122 by preferably approximately 2 mm up to approximately 5 mm, water drops extending up to the metallic plate 126 of the upper functional layer 102 are prevented from forming in the outer boundary region of the second component 122. Such drops, which would be in simultaneous contact with the magnesium alloy of the second component 122 and the spring steel of the metallic plate 126, could likewise lead to corrosion of the magnesium alloy.

In order to prevent the formation of such corrosion-enhancing liquid drops, provision may be made, in particular, for the sealing element 140 not to end at the outer edge 142 of the metallic plate 126, but rather, to surround this outer edge 142.

As being a comparatively easily deformable, electrically insulating elastomer material, a silicone rubber can be used for the sealing element 140 for example.

An addition-cross-linked silicone rubber, which contains H-siloxane as the cross-linking agent and is sold under the name "Elastosil" by the company Wacker Polymer Systems GmbH & Co. Kg, Johannes Hess Straβe 24, in 84489 Bughausen, Germany is particularly suitable. This silicone rubber has a Shore hardness in the cross-linked state of approximately 50.

As an alternative or in addition to an addition-cross-linked silicone rubber, a condensation-cross-linked silicone rubber could also be used.

When assembling the cylinder head gasket 100 described hereinabove, the beads 114 and 116 of the functional layers 102 and 104 are in series with the force, whereas the sealing element 140 is shunted by the force due to the circumstance that the outer edge 136 of the metallic plate 128 of the lower functional layer 104 is set back with respect to the outer edge 142 of the metallic plate 126 of the upper functional layer 102. Excessive deformation of the comparatively easily deformable and soft sealing element 140 is thereby prevented.

Figure 3:
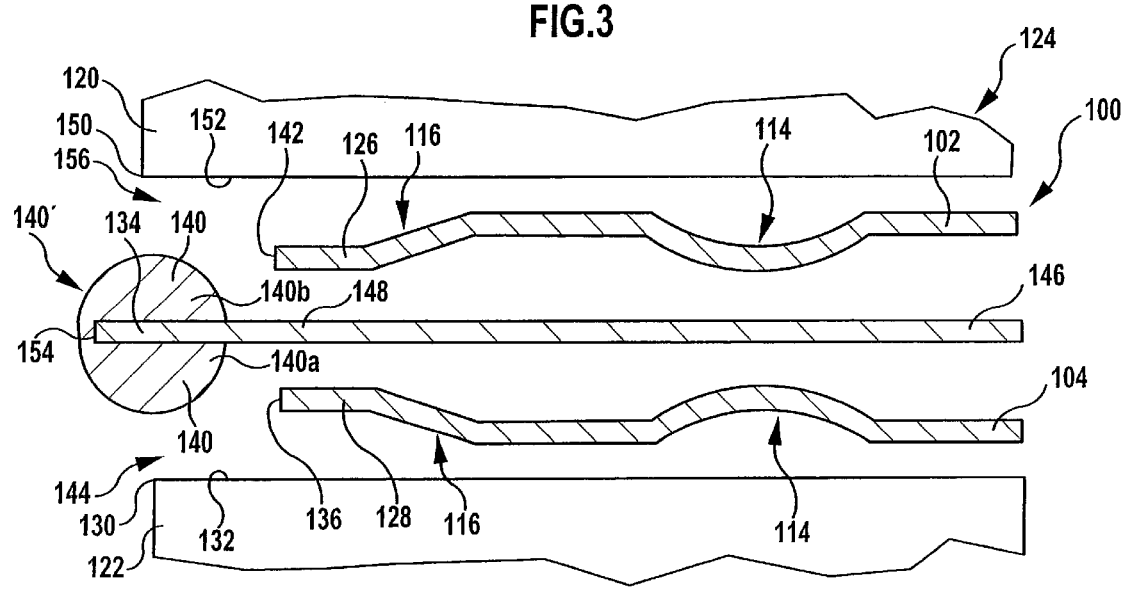
FIG. 3 a schematic section corresponding to FIG. 2 through a second embodiment of a cylinder head gasket which comprises three gasket layers and a respective sealing element consisting of an elastomer material on both sides of the gasket plate of the middle layer.

A second embodiment of a cylinder head gasket 100 that is illustrated in FIG. 3 differs from the previously described first embodiment in that, apart from the upper functional layer 102 and the lower functional layer 104, the cylinder head gasket also comprises a carrier layer 146 which is arranged between these two functional layers and likewise comprises a metallic plate 148 although this plate is not provided with beads and consequently does not have to be formed of spring steel but can be made of some other steel sheet.

As can be seen from FIG. 3, the metallic plates 126 and 128 of the two functional layers end at a distance before the outer edge 130 of the sealing surface 132 of the second component 122 and at a distance before the outer edge 150 of the sealing surface 152 of the first component 120, whilst the metallic plate 148 of the carrier layer 146 comprises an outer boundary region 134 which extends laterally beyond the outer edges 142 and 136 of the respective functional layers 102 and 104 and beyond the respective outer edges 130 and 150 of the second component 122 and the first component 120.

A sealing element 140 consisting of an elastomer material is arranged on each of the two major surfaces of the boundary region 134. The outer edges of these two sealing elements 140, which are formed in a manner corresponding to that of the sealing element 140 of the first embodiment, are connected together by a web that covers the outer edge 154 of the metallic plate 148 of the carrier layer 146 so that the total sealing element 140' formed from the two partial sealing elements 140 completely encloses the outer boundary region 134 of the metallic plate 148.

In the installed state of this embodiment of the cylinder head gasket 100, the lower sealing element 140a seals the gap 144 between the carrier layer 146 and the second component 122, whilst the upper sealing element 140b seals the gap 156 between the carrier layer 146 and the first component 120 against the penetration of water splashes in a fluid-tight manner.

Due to the symmetrical arrangement of the total sealing element 140' of this second embodiment of a cylinder head gasket 100, crevice corrosion is effectively prevented even if both the second component 122 and the first component 120 contain a reactive metal such as magnesium for example.

Furthermore, the previously described symmetrical arrangement of the total sealing element 140' is particularly apt if, in toto, the cylinder head gasket 100 is mirror-symmetrical with respect to the carrier layer 146 and should also be usable in a position rotated through 180°.

In all other respects, the second embodiment of a cylinder head gasket 100 corresponds as regards the structure and functioning thereof with the first embodiment so that, to this extent, reference should be made to the previous description thereof.

Figure 4:
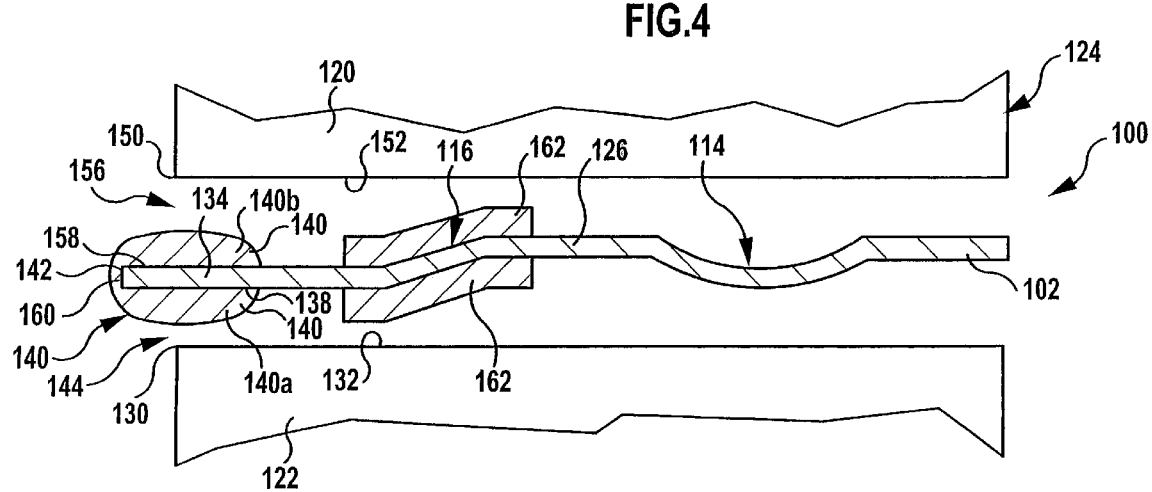
FIG. 4 a schematic section corresponding to FIG. 2 through a third embodiment of a gasket which comprises just a single gasket layer provided with a respective sealing element consisting of an elastomer material on both sides of the gasket plate thereof and, adjacent to the sealing elements, a bead having a coating of an elastomer material which is less easily deformable than the elastomer material of the sealing elements.

A third embodiment of a cylinder head gasket 100 that is illustrated in FIG. 4 differs from the two previously described embodiments in that this cylinder head gasket 100 comprises just a single functional layer 102 and no further layers.

The functional layer 102 comprises a metallic plate 126 made of spring steel which is provided with beads 114 and 116.

An outer boundary region 134 of the metallic plate 126 projects laterally beyond the outer edge 130 of the sealing surface 132 of the second component 122 and beyond the outer edge 150 of the sealing surface 152 of the first component 120.

This outer boundary region 134 is provided with a respective sealing element 140 consisting of an elastomer material on both its lower surface 138 and its upper surface 158, wherein these two sealing elements 140 are connected together by a web 160 consisting of an elastomer material which covers the outer edge 142 of the functional layer 102 and thus forms a continuous total sealing element 140' which surrounds the outer edge 142 of the metallic plate 126 and completely encloses the outer boundary region 134 of the metallic plate 126.

The sealing elements 140 preferably have a cross-section that is more flattened compared with a semicircular cross-section.

In the installed state of the cylinder head gasket 100, the lower sealing element 140*a* seals the gap 144 between the functional layer 102 and the second component 122 against the penetration of splashes of water in fluid-tight manner, whilst the upper sealing element 140 similarly seals the gap 156 between the functional layer 102 and the first component 120 in fluid-tight manner.

In order for the entire sealing element 140' of the third embodiment of a cylinder head gasket 100 to be shunted by the force, both sides of the bead 116 running in the proximity of the total sealing element 140' are provided with a coating 162 consisting of an elastomer material which is less easily deformable and a has a higher Shore hardness than the elastomer material from which the sealing elements 140 are formed.

Due to this measure, the sealing elements 140 are prevented from being excessively deformed when the components 120, 122 are clamped together.

For example, a nitrile butadiene rubber (NBR) is suitable as the material for this coating 162 of the bead 116.

A suitable composition of a coating mass for the production of the coating 162 is as follows:

100 parts by weight NBR polymer;
50 parts by weight carbon black;
150 parts by weight of fillers, for example calcium silicate;
5 parts by weight vulcanising agent;
15 parts by weight phenolic resin; and
900 parts by weight butoxyl (as solvent).

The thickness of the coating 162 preferably amounts to approximately 6 μm to approximately 100 μm.

In all other respects, the third embodiment of a cylinder head gasket 100 corresponds in regard to the structure and functioning thereof to the two first embodiments so that, to this extent, reference should be made to the previous description thereof.

The sealing elements 140 and the coatings 162 in the previously described embodiments of a cylinder head gasket 100 are preferably applied to the respective metallic plates by means of a pattern printing process, in particular by means of a silk-screen printing process or a screen printing process.

The invention claimed is:

1. A gasket adapted to be arranged between two components requiring sealing, of which at least one component contains a first metallic material which is less noble than aluminium, comprising at least one gasket layer incorporating a plate comprising a second metallic material which is nobler than the first metallic material, wherein the gasket layer comprises a sealing element which is arranged at an outer boundary region of the plate for sealingly contacting at least one sealing surface of at least one of said components in the installed state of the gasket, comprises an elastomer material and, in the installed state of the gasket, seals a gap between the gasket layer and said at least one component which contains the first metallic material in a substantially fluid-tight manner, wherein said plate projects laterally beyond said at least one sealing surface of at least one of said components in the installed state of the gasket.

2. A gasket in accordance with claim 1, wherein the plate of the gasket layer is provided with at least one bead which comprises a coating containing an elastomer material, wherein the material of the coating is more difficult to deform by the effect of a compressive force than the material of the sealing element.

3. A gasket in accordance with claim 1, wherein the plate of the gasket layer is provided with at least one bead which comprises a coating containing an elastomer material, wherein the material of the coating has a higher Shore hardness than the material of the sealing element.

4. A gasket in accordance with claim 1, wherein the sealing element extends at least up to an outer edge of the plate of the gasket layer.

5. A gasket in accordance with claim 1, wherein the sealing element extends at least up to an outer edge of a sealing surface of the component requiring sealing with which the sealing element is in contact in the installed state of the gasket.

6. A gasket in accordance with claim 1, wherein the sealing element projects laterally beyond an outer edge of a sealing surface of the component requiring sealing with which the sealing element is in contact in the installed state of the gasket.

7. A gasket in accordance with claim 6, wherein the sealing element projects laterally beyond the outer edge of the sealing surface by at least approximately 1 mm.

8. A gasket in accordance with claim 7, wherein the sealing element projects laterally beyond the outer edge of the sealing surface by at least approximately 2 mm.

9. A gasket in accordance with claim 6, wherein the sealing element projects laterally beyond the outer edge of the sealing surface by at most approximately 10 mm.

10. A gasket in accordance with claim 9, wherein the sealing element projects laterally beyond the outer edge of the sealing surface by at most approximately 6 mm.

11. A gasket in accordance with claim 1, wherein the sealing element surrounds an outer edge of the plate of the gasket layer.

12. A gasket in accordance with claim 1, wherein the sealing element extends along an outer edge of the plate of the gasket layer.

13. A gasket in accordance with claim 1, wherein the sealing element extends around an entire outer edge of the plate of the gasket layer.

14. A gasket in accordance with claim 1, wherein the thickness of the sealing element prior to the installation of the gasket is at least approximately 100 μm.

15. A gasket in accordance with claim 14, wherein the thickness of the sealing element prior to the installation of the gasket is at least approximately 250 μm.

16. A gasket in accordance with claim 1, wherein the thickness of the sealing element prior to the installation of the gasket is at most approximately 600.

17. A gasket in accordance with claim 16, wherein the thickness of the sealing element prior to the installation of the gasket is at most approximately 450 μm.

18. A gasket in accordance with claim 1, wherein the sealing element has a Shore hardness of at most approximately 100.

19. A gasket in accordance with claim 18, wherein the sealing element has a Shore hardness of at most approximately 70.

20. A gasket in accordance with claim 1, wherein the sealing element has an electrically insulating effect.

21. A gasket in accordance with claim 1, wherein the sealing element is formed entirely of an elastomer material.

22. A gasket in accordance with claim 1, wherein the sealing element contains an addition-crosslinked silicone rubber.

23. A gasket in accordance with claim 1, wherein the sealing element contains a condensation-cross-linked silicone rubber.

24. A gasket in accordance with claim 1, wherein the gasket comprises at least a first gasket layer and a second gasket layer which each comprise a metallic plate, wherein the plate of the first gasket layer comprises an outer boundary region which projects laterally beyond an outer edge of the plate of the second gasket layer, and wherein the sealing element is arranged on the side of the outer boundary region which faces the second gasket layer.

25. A gasket in accordance with claim 24, wherein the gasket comprises a third gasket layer which comprises a metallic plate, wherein the outer boundary region of the plate of the first gasket layer projects laterally beyond an outer edge of the plate of the third gasket layer and wherein a second sealing element is arranged on the side of the outer boundary region facing the third layer, said second sealing element comprising an elastomer material and, in the installed state of the gasket, sealing the gap between the first gasket layer and one of the components requiring sealing in a substantially fluid-tight manner.

26. A gasket in accordance with claim 1, wherein the gasket is in the form of a single layer.

27. A gasket in accordance with claim 1, wherein the gasket is in the form of a double layer.

28. A gasket in accordance with claim 1, wherein the gasket is in the form of a triple layer.

29. A gasket in accordance with claim 1, wherein the gasket is in the form of a cylinder head gasket.

30. Combination of two components requiring sealing wherein at least one of the components contains a first metallic material which is less noble than aluminium, and a gasket arranged between the two components and comprising at least one gasket layer incorporating a plate comprising a second metallic material which is nobler than the first metallic material, wherein the gasket layer comprises a sealing element which is arranged at an outer boundary region of the plate for sealingly contacting at least one sealing surface of at least one of said components in the installed state of the gasket, comprises an elastomer material and, in the installed state of the gasket, seals a gap between the gasket layer and said at least one component which contains the first metallic material in a substantially fluid-tight manner, wherein said plate projects laterally beyond said at least one sealing surface of at least one of said components in the installed state of the gasket.

31. A method of sealing between two components requiring sealing, of which at least one of the two components contains a first metallic material that is less noble than aluminium comprising arranging a gasket between the two components wherein the gasket comprises at least one gasket layer incorporating a plate comprising a second metallic material which is nobler than the first metallic material, wherein the gasket layer comprises a sealing element which is arranged at an outer boundary region of the plate to sealingly contact at least one sealing surface of at least one of said components in the installed state of the gasket, comprises an elastomer material and, in the installed state of the gasket, seals a gap between the gasket layer and said at least one component which contains the first metallic material in a substantially fluid-tight manner, wherein said plate projects laterally beyond said at least one sealing surface of at least one of said components in the installed state of the gasket.

32. A gasket that is adapted to be arranged between two components requiring sealing, said gasket comprising at least a first gasket layer and a second gasket layer each of which comprises a metallic plate, wherein the plate of the first gasket layer comprises an outer boundary region which projects laterally beyond an outer edge of the plate of the second gasket layer, and wherein a sealing element is arranged on the side of the outer boundary region facing the second layer, said sealing element comprising an elastomer material and, in the installed state of the gasket, sealing the gap between the first gasket layer and one of the components requiring sealing in a substantially fluid-tight manner.

33. A gasket in accordance with claim 32, wherein the sealing element extends at least up to an outer edge of the metallic plate of the first gasket layer.

34. A gasket in accordance with claim 32, wherein the sealing element extends at least up to an outer edge of a sealing surface of the component requiring sealing with which the sealing element is in contact in the installed state of the gasket.

35. A gasket in accordance with claim 32, wherein the sealing element projects laterally beyond an outer edge of a sealing surface of the component requiring sealing with which the sealing element is in contact in the installed state of the gasket.

36. A gasket in accordance with claim 35, wherein the sealing element projects laterally beyond the outer edge of the sealing surface by at least approximately 1 mm.

37. A gasket in accordance with claim 36, wherein the sealing element projects laterally beyond the outer edge of the sealing surface by at least approximately 2 mm.

38. A gasket in accordance with claim 35, wherein the sealing element projects laterally beyond the outer edge of the sealing surface by at most approximately 10 mm.

39. A gasket in accordance with claim 38, wherein the sealing element projects laterally beyond the outer edge of the sealing surface by at most approximately 6 mm.

40. A gasket in accordance with claim 32, wherein the sealing element surrounds an outer edge of the metallic plate of the first gasket layer.

41. A gasket in accordance with claim 32, wherein the gasket comprises a third gasket layer which comprises a metallic plate, wherein the outer boundary region of the plate of the first gasket layer projects laterally beyond an outer edge of the plate of the third gasket layer and wherein a second sealing element is arranged on the side of the outer boundary region facing the third layer, said sealing element comprising an elastomer material and, in the installed state of the gasket, sealing the gap between the first gasket layer and one of the components requiring sealing in a substantially fluid-tight manner.

42. A gasket in accordance with claim 32, wherein the plate of the first gasket layer projects laterally beyond an outer edge of a sealing surface of the component requiring sealing with which the sealing element is in contact in the installed state of the gasket.

43. A gasket in accordance with claim 32, wherein the sealing element extends along an outer edge of the metallic plate of the first gasket layer.

44. A gasket in accordance with claim 32, wherein the sealing element extends around an entire outer edge of the metallic plate of the first gasket layer.

45. A gasket in accordance with claim 32, wherein the thickness of the sealing element prior to the installation of the gasket is at least approximately 100 μm.

46. A gasket in accordance with claim 45, wherein the thickness of the sealing element prior to the installation of the gasket is at least approximately 250 μm.

47. A gasket in accordance with claim 32, wherein the thickness of the sealing element prior to the installation of the gasket is at most approximately 600 μm.

48. A gasket in accordance with claim 47, wherein the thickness of the sealing element prior to the installation of the gasket is at most approximately 450 μm.

49. A gasket in accordance with claim 32, wherein the sealing element has a Shore hardness of at most approximately 100.

50. A gasket in accordance with claim 49, wherein the sealing element has a Shore hardness of at most approximately 70.

51. A gasket in accordance with claim 32, wherein the sealing element has an electrically insulating effect.

52. A gasket in accordance with claim 32, wherein the sealing element is formed entirely of an elastomer material.

53. A gasket in accordance with claim 32, wherein the sealing element contains an addition-cross-linked silicone rubber.

54. A gasket in accordance with claim 32, wherein the sealing element contains a condensation-cross-linked silicone rubber.

55. A gasket in accordance with claim 32, wherein the component on which the sealing element is seated in the installed state of the gasket contains a metallic material which is less noble than aluminium.

56. A gasket in accordance with claim 32, wherein the plate of the first gasket layer is formed from a metallic material which is nobler than a metallic material from which the boundary region of the component is formed and upon which the sealing element is seated in the installed state of the gasket.

57. A gasket in accordance with claim 32, wherein the gasket is; in the form of a double layer comprising the first gasket layer and the second gasket layer.

58. A gasket in accordance with claim 32, wherein the gasket is in the form of a triple layer comprising the first gasket layer and the second gasket layer and a third gasket layer.

59. A gasket in accordance with claim 32, wherein the gasket is in the form of a cylinder head gasket.

60. Combination of two components requiring sealing wherein at least one of the components contains a metallic material which is less noble than aluminium, and a gasket arranged between the two components and comprising at least a first gasket layer and a second gasket layer each of which comprises a metallic plate, wherein the plate of the first gasket layer comprises an outer boundary region which projects laterally beyond an outer edge of the plate of the second gasket layer, and wherein a sealing element is arranged on the side of the outer boundary region facing the second layer, said sealing element comprising an elastomer material and, in the installed state of the gasket, sealing the gap between the first gasket layer and one of the components requiring sealing in a substantially fluid-tight manner.

61. A method of sealing between two components requiring sealing, of which at least one of the two components contains a metallic material that is less noble than aluminium, comprising arranging a gasket between the two components wherein the gasket comprises at least a first gasket layer and a second gasket layer each of which comprises a metallic plate, wherein the plate of the first gasket layer comprises an outer boundary region which projects laterally beyond an outer edge of the plate of the second gasket layer, and wherein a sealing element is arranged on the side of the outer boundary region facing the second layer, said sealing element comprising an elastomer material and, in the installed state of the gasket, sealing the gap between the first gasket layer and one of the components requiring sealing in a substantially fluid-tight manner.

62. A gasket adapted to be arranged between two components requiring sealing, of which at least one contains a first metallic material which is less noble than aluminium, comprising at least one gasket layer incorporating a plate comprising a second metallic material which is nobler than the first metallic material, wherein the gasket layer comprises a sealing element which is arranged at an outer boundary region of the plate, comprises an elastomer material and, in the installed state of the gasket, seals the gap between the gasket layer and the component which contains the first metallic material in a substantially fluid-tight manner and wherein the plate of the gasket layer is provided with at least one bead which comprises a coating containing an elastomer material, wherein the material of the coating is more difficult to deform by the effect of a compressive force than the material of the sealing element.

63. A gasket adapted to be arranged between two components requiring sealing, of which at least one contains a first metallic material which is less noble than aluminium,
   comprising at least one gasket layer incorporating a plate comprising a second metallic material which is nobler than the first metallic material, wherein the gasket layer comprises a sealing element which is arranged at an outer boundary region of the plate so as to surround an outer edge of the plate of the gasket layer, comprises an elastomer material and, in the installed state of the gasket, seals the gap between the gasket layer and the component which contains the first metallic material in a substantially fluid-tight manner.

* * * * *